(12) United States Patent
Iwasaki (10) Patent No.: US 10,700,354 B2
(45) Date of Patent: Jun. 30, 2020

(54) METHOD FOR COMPOSITE ACTIVE MATERIAL

(71) Applicant: TOYOTA JIDOSHA KABUSHIKI KAISHA, Toyota-shi, Aichi-ken (JP)

(72) Inventor: Masahiro Iwasaki, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 104 days.

(21) Appl. No.: 16/137,571

(22) Filed: Sep. 21, 2018

(65) Prior Publication Data

US 2019/0027751 A1    Jan. 24, 2019

Related U.S. Application Data

(62) Division of application No. 15/419,601, filed on Jan. 30, 2017, now Pat. No. 10,122,017.

(30) Foreign Application Priority Data

Feb. 26, 2016 (JP) .................................. 2016-036372

(51) Int. Cl.
*H01M 4/04* (2006.01)
*H01M 4/525* (2010.01)
*H01M 4/36* (2006.01)
*H01M 4/505* (2010.01)
*H01M 4/485* (2010.01)
*H01M 10/0562* (2010.01)
(Continued)

(52) U.S. Cl.
CPC ............ *H01M 4/525* (2013.01); *H01M 4/043* (2013.01); *H01M 4/366* (2013.01); *H01M 4/485* (2013.01); *H01M 4/505* (2013.01); *H01M 10/0562* (2013.01); *H01M 4/131* (2013.01); *H01M 4/1391* (2013.01); *H01M 2004/021* (2013.01); *H01M 2300/0068* (2013.01); *H01M 2300/0071* (2013.01)

(58) Field of Classification Search
USPC ........................................................ 427/115
See application file for complete search history.

(56) References Cited

U.S. PATENT DOCUMENTS 6,071,644 A    6/2000  Ikemachi et al.
2009/0081554 A1*  3/2009  Takada ................... H01M 4/13
                                                                      429/322

(Continued)

FOREIGN PATENT DOCUMENTS

CN    105261745 A    1/2016
JP    10-149818 A    6/1998
(Continued)

*Primary Examiner* — Brian K Talbot
(74) *Attorney, Agent, or Firm* — Dickinson Wright PLLC (57) ABSTRACT

The main object of the present disclosure is to provide a composite active material with a capability of improving a battery output. The present disclosure achieves the object by providing a composite active material comprising: an oxide active material, an oxide solid electrolyte layer that coats a surface of the oxide active material, and a sulfide solid electrolyte layer that coats a surface of the oxide solid electrolyte layer; wherein the sulfide solid electrolyte layer has a specific surface area in a range of 1.06 $m^2$/g to 1.22 $m^2$/g, and a thickness the sulfide solid electrolyte layer is in a range of 15 nm to 25 nm.

6 Claims, 5 Drawing Sheets

(51) Int. Cl.
    *H01M 4/02*      (2006.01)
    *H01M 4/1391*    (2010.01)
    *H01M 4/131*     (2010.01)

(56) References Cited

U.S. PATENT DOCUMENTS

| | | |
|---|---|---|
| 2011/0195315 A1 | 8/2011 | Tsuchida |
| 2015/0311445 A1 | 10/2015 | Udaka et al. |
| 2015/0340681 A1 | 11/2015 | Iwasaki et al. |
| 2015/0372345 A1 | 12/2015 | Kato et al. |
| 2016/0013479 A1 | 1/2016 | Iwasaki |
| 2017/0250403 A1* | 8/2017 | Iwasaki ............... H01M 4/0402 |

FOREIGN PATENT DOCUMENTS

| | | |
|---|---|---|
| JP | 2012-146507 A | 8/2012 |
| JP | 2014-022074 A | 2/2014 |
| JP | 2014-135216 A | 7/2014 |
| JP | 2014-154406 A | 8/2014 |
| JP | 2014-154407 A | 8/2014 |
| JP | 2016-18735 A | 2/2016 |
| WO | 2014/122520 A1 | 8/2014 |
| WO | 2014/073446 A1 | 5/2015 |
| WO | 2015/185129 A1 | 12/2015 |

* cited by examiner

Comparative Example 2

FIG. 4B

Comparative Example 3

METHOD FOR COMPOSITE ACTIVE MATERIAL

RELATED APPLICATIONS

This application is a division of U.S. patent application Ser. No. 15/419,601, filed Jan. 30, 2017, now U.S. Pat. No. 10,122,017 which claimed priority to Japanese Application No. 2016-036372, filed Feb. 26, 2016, which are hereby incorporated by reference herein in their entireties.

TECHNICAL FIELD

The present disclosure relates to a composite active material with a capability of improving a battery output, a solid battery using the composite active material, and a method for producing a composite active material.

BACKGROUND ART

In accordance with a rapid spread of information related to apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery is of interest from the viewpoint of a high energy density compared to other kinds of batteries.

A liquid electrolyte including a flammable organic solvent is used for a conventional commercial lithium battery, so that the installation of a safety device for restraining temperature rise during a short circuit and the improvement in structure for preventing the short circuit are necessary therefor. In contrast, a solid state battery such that the liquid electrolyte is replaced with a solid electrolyte layer to provide an all solid battery is conceived to simplify the safety device and improve production cost and productivity because a flammable organic solvent is not used in the battery.

Solid electrode materials (such as an active material, a solid electrolyte material, and a conductive material) form the electrode body of an all solid battery, so that the structure in which materials are adhered to each other is important. For example, Patent Literature 1 discloses a composite active material having an active material (such as $LiNi_{1/3}Mn_{1/3}Co_{1/3}O_2$), an oxide solid electrolyte layer (such as $LiNbO_3$) that coats the active material, and a sulfide solid electrolyte layer. Patent Literature 1 also discloses a configuration where the coverage of the sulfide solid electrolyte layer is 76% or more, preferably in a range of 85% to 95%. The object of Patent Literature 1 is to decrease the reaction resistance of a battery. As for another example, Patent Literature 2 discloses a technique of forming a coating layer including a sulfide solid electrolyte material in the surface of the active material by conducting a rotation and revolution mixing treatment with respect to the raw material composition including an active material and a sulfide solid electrolyte material. As for the other example, Patent Literature 3 discloses the configuration of BET specific surface area of a composite active material in which the active material is coated with a sulfide solid electrolyte material, being less than 2.82 $m^2/g$.

CITATION LIST

Patent Literatures

Patent Literature 1: Japanese Patent Application Laid-Open (JP-A) No. 2014-154407
Patent Literature 2: JP-A No. 2014-022074
Patent Literature 3: JP-A No. 2014-154406

SUMMARY OF DISCLOSURE

Technical Problem

Further improvements in a battery output are desired in accordance with the superior performance of an all solid battery. The present disclosure has been made in view of the actual circumstances, and the main object thereof is to provide a composite active material with a capability of improving a battery output.

Solution to Problem

In order to achieve the object, the present inventor conducted thorough research and as the result, discovered that adjustments or modification of the specific surface area as well as the thickness of the sulfide solid electrolyte layer which coats the active material, to a specific range allow remarkable improvement in a battery output compared with a conventional composite active material. The present disclosure is based on this finding.

The present disclosure provides a composite active material comprising an oxide active material, an oxide solid electrolyte layer that coats a surface of the oxide active material, and a sulfide solid electrolyte layer that coats a surface of the oxide solid electrolyte layer, wherein the sulfide solid electrolyte layer has a specific surface area in a range of 1.06 $m^2/g$ to 1.22 $m^2/g$, and a thickness in a range of 15 nm to 25 nm.

According to the present disclosure, the sulfide solid electrolyte layer has the specific values for the specific surface area and thickness, so that the composite active material may be capable of improving the battery output.

The present disclosure provides a solid battery comprising a cathode active material layer, an anode active material layer, and a solid electrolyte layer formed between the cathode active material layer and the anode active material layer, wherein either the cathode active material layer or the anode active material layer contains the above-described composite active material.

According to the present disclosure, either the cathode active material layer or the anode active material layer contains the above-described composite active material, so that the solid battery is able to exhibit high output.

Also, the present disclosure provides a method for producing the above-described composite active material, comprising a coating step of forming the sulfide solid electrolyte layer by applying a compression shearing treatment using a rotation blade with respect to the oxide active material coated with the oxide solid electrolyte layer, and to the sulfide solid electrolyte material, wherein the compression shearing treatment is conducted under conditions of: under pressure that is decompressed to a pressure less than an atmospheric pressure; a blade rotation speed in a range of 16.5 m/s to 19.8 m/s; and a treatment time in a range of 10 minutes to 15 minutes.

According to the present disclosure, the compression shearing treatment is conducted under the conditions of:

under pressure that is decompressed to a pressure less than an atmospheric pressure, specific blade rotation speed, and specific treatment time, so that the composite active material with capability of improving the battery output may be produced.

Advantageous Effects of Disclosure

The present disclosure provides a composite active material with a capability of improving a battery output.

DESCRIPTION OF EMBODIMENTS

A composite active material, a solid battery and a producing method for a composite active material of the present disclosure will be hereinafter described in detail.

A. Composite Active Material

Figure 1:
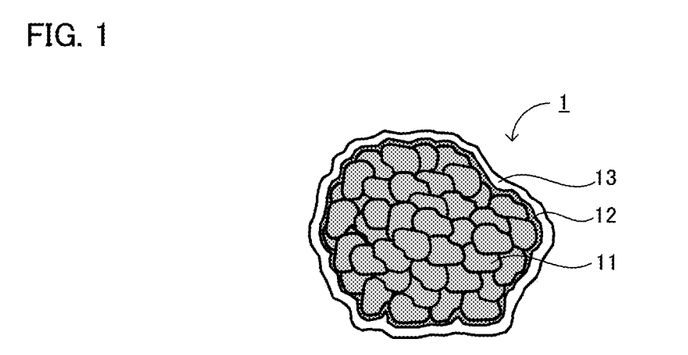
FIG. 1 is a schematic cross-sectional view illustrating an example of a composite active material of the present disclosure.

FIG. 1 is a schematic cross-sectional view illustrating an example of a composite active material of the present disclosure. A composite active material 1 illustrated in FIG. 1 has an oxide active material 11, an oxide solid electrolyte layer 12 that coats the surface of the oxide active material 11, and a sulfide solid electrolyte layer 13 that coats the surface of the oxide solid electrolyte layer 12. The present disclosure features the configuration that the specific surface area of the sulfide solid electrolyte layer 13 is in the range of 1.06 $m^2/g$ to 1.22 $m^2/g$, and the thickness of the sulfide solid electrolyte layer is in the range of 15 nm to 25 nm.

According to the present disclosure, the sulfide solid electrolyte layer has specific values for the specific surface area and thickness, so that the composite active material may be capable of improving the battery output.

As described above, further improvement in a battery output is demanded for an all solid battery. The present inventor has thoroughly researched and thereby discovered that the adjustments or modifications of the specific surface area as well as thickness of the sulfide solid electrolyte layer which coats the active material, in a specific range allow remarkable improvement in the battery output compared with a conventional composite active material.

The reason therefor is presumed as follows.

A sulfide solid electrolyte layer of a composite active material is an essential constitution for improving an ion conducting path in an electrode. Meanwhile, too thick sulfide solid electrolyte layer may cause a breakage of the electron conducting path. Also, too small specific area surface of the sulfide solid electrolyte layer may smooth (flatten) the surface of the sulfide solid electrolyte layer whereby, the area in which the composite active material contacts the conductive material in an electrode becomes small, and thus interferes with the electron conductive path.

On the contrary, the sulfide solid electrolyte layer in the present disclosure has a specific thickness so as to inhibit occurrence of the breakage in an electron conducting path. Also, the sulfide solid electrolyte layer has the specific values for the specific surface area so as to provide appropriate concave and convex areas to the surface of the sulfide solid electrolyte layer thereby providing a larger area in which the composite active material contacts the conductive material (frequency of the contact may be increased). Accordingly, it is presumed that the sulfide solid electrolyte layer in the present disclosure has the specific values for the thickness and specific surface area, so that the ion conducting path may be improved while securing the electron conducting path, and the battery output may be remarkably improved.

For example, from the viewpoint of improving the ion conducting path, the coverage of the sulfide solid electrolyte layer is preferably high. However, if the coverage of the sulfide solid electrolyte layer is simply increased, the thickness of the sulfide solid electrolyte layer usually tends to be thick, and the specific surface area tends to be small. Accordingly, it is presumed to be difficult to achieve the improvement of both the electron conducting path and the ion conducting path only by adjusting the coverage of the sulfide solid electrolyte layer.

The composite active material of the present disclosure will be hereinafter described in each constitution.

1. Sulfide Solid Electrolyte Layer

The sulfide solid electrolyte layer in the present disclosure contains a sulfide solid electrolyte material, and usually coats the surface of an oxide solid electrolyte layer. The sulfide solid electrolyte layer features the configuration having the specific values for its thickness and specific surface area. The sulfide solid electrolyte layer may be formed as the outermost layer of the composite active material, and another layer may be further formed on the surface of the sulfide solid electrolyte layer.

"Specific surface area of a sulfide solid electrolyte layer" in the present disclosure refers to a surface area of a sulfide solid electrolyte layer per unit weight of a composite active material. Incidentally, if the composite active material has another layer formed on the surface of the sulfide solid electrolyte layer, the specific surface area is calculated by setting the weight of the material excluding the other layer as the denominator.

The specific surface area of the sulfide solid electrolyte layer is usually 1.06 $m^2/g$ or more, and preferably 1.08 $m^2/g$ or more. Also, the specific surface area of the sulfide solid electrolyte layer is usually 1.22 $m^2/g$ or less, and preferably 1.18 $m^2/g$ or less. The reason therefor is because if the specific surface area of the sulfide solid electrolyte layer is small, the sulfide solid electrolyte layer is formed flatly on the surface of the oxide active material, so that the area contacting the conductive material becomes small, and thereby it may be difficult to secure the electron conducting path in some cases. On the other hand, if the specific surface area of the sulfide solid electrolyte layer is large, it may be difficult to sufficiently adhere the sulfide solid electrolyte layer to the surface of the oxide solid electrolyte material in some cases. The specific surface area of the sulfide solid electrolyte layer may be measured by a nitrogen absorbing BET method.

The thickness of the sulfide solid electrolyte layer is usually 15 nm or more, and preferably 20 nm or more. Also, the thickness of the sulfide solid electrolyte layer is usually 25 nm or less, and preferably 24.5 nm or less. In one embodiment, the sulfide solid electrolyte has a thickness of 15 nm to 25 nm. The reason therefor is because it may be difficult to sufficiently secure the ion conducting path in some cases if the thickness of the sulfide solid electrolyte layer is thin. On the other hand, it may be difficult to sufficiently secure the electron conducting path in some cases if the thickness of the sulfide solid electrolyte layer is thick. The thickness of the sulfide solid electrolyte layer is the average thickness; for example, it may be calculated as the average value measured by observation with a transmission electron microscope (TEM) (such as n≥100). Also, if the composite active material is produced by a method described in "B. Producing method for composite active material" later, the average thickness may be measured by the method in the later described Example.

The coverage of the sulfide solid electrolyte layer in the composite active material is preferably 90% or more for example, more preferably 95% or more, and particularly preferably 97% or more. Also, the sulfide solid electrolyte layer may coat the entire surface of the composite active material. The coverage of the sulfide solid electrolyte layer may be 99% or less, for example. The coverage of the sulfide solid electrolyte layer may be measured by a transmission electron microscope (TEM) and X-ray photoelectron spectrometry (XPS), for examples.

Examples of the sulfide solid electrolyte material to be used for the sulfide solid electrolyte layer may include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are a positive number; Z is one selected from the group consisting of Ge, Zn, and Ga), $Li_2S$—$GeS_2$, $Li_2S$—$SiS_2$—$Li_3PO_4$, $Li_2S$—$SiS_2$—$Li_xMO_y$ (where x and y are a positive number; M is one selected from the group consisting of P, Si, Ge, B, Al, Ga, and In), and $Li_{10}GeP_2S_{12}$. It is preferable that the sulfide solid electrolyte material has high Li ion conductivity.

In particular, the sulfide solid electrolyte material is preferably provided with an ion conductor that contains Li, A (A is at least one selected from the group consisting of P, Si, Ge, Al and B), and S. Further, the ion conductor preferably has an anion structure of an ortho composition (a $PS_4^{3-}$ structure, $SiS_4^{4-}$ structure, $GeS_4^{4-}$ structure, $AlS_3^{3-}$ structure, and $BS_3^{3-}$ structure) as the main component of the anion. The reason therefor is to provide the sulfide solid electrolyte material with high chemical stability. The proportion of the anion structure of the ortho composition with respect to the all anion structures in the ion conductor is preferably 70 mol % or more, and more preferably 90 mol % or more. The proportion of the anion structure of the ortho composition may be determined by Raman spectrometry, NMR, and XPS, for example.

The sulfide solid electrolyte material may or may not contain lithium halide in addition to the ion conductor. Examples of the lithium halide may include LiF, LiCl, LiBr and LiI; above all, LiCl, LiBr and LiI are preferable. Respectively, LiF, LiCl, LiBr and LiI are preferably present in the state taken into the structure of the ion conductor as a LiF component, LiI component, LiBr component, and LiCl component. In other words, the sulfide solid electrolyte material preferably contains the lithium halide as not in the simple mixture but in the state physically not separable. The proportion of LiX (X=I, Cl, Br) in the sulfide solid electrolyte material is in a range of 5 mol % to 30 mol % for example, and is preferably in a range of 15 mol % to 25 mol %. The proportion of LiX is based on the total proportion of LiX contained in the sulfide solid electrolyte material.

The sulfide solid electrolyte material may be a crystalline material, and may be an amorphous material. Also, the sulfide solid electrolyte material may be glass, and may be crystallized glass (glass ceramics). In particular, glass ceramics are preferable.

2. Oxide Active Material

The oxide active material in the present disclosure is not particularly limited, but preferably contains a Li element, a transition metal element, and an O element. In particular, the oxide active material preferably contains a Li element, a transition metal element, and an O element as the main body. The total proportion of the Li element, transition metal element, and O element in the elements that constitute the oxide active material is: 50 mol % or more for example, preferably 70 mol % or more, and more preferably 90 mol % or more. Also, examples of the transition metal element may include Co, Ni, Mn, V, Ti, Fe, and Si. Above all, the oxide active material preferably contains at least one of Co, Ni, and Mn as the transition metal element.

Examples of the oxide active material may include a Li-containing transition metal oxide represented by a general formula: $Li_xM_yO_z$ (M is a transition metal element; x=0.02 to 2.2; y=1 to 2; z=1.4 to 4). In particular, rock salt bed type active materials such as $LiVO_2$ and a general formula: $LiNi_xMn_yCo_zO_2$ (x≥0, y≥0, z≥0, x+y+z=1) (such as $LiCoO_2$, $LiMnO_2$, $LiNiO_2$, and $LiNi_{1/3}Co_{1/3}Mn_{1/3}O_2$); spinel type active materials such as $LiMn_2O_4$, $Li_4Ti_5O_{12}$, and $Li(Ni_{0.5}Mn_{1.5})O_4$; olivine type active materials (metal lithium phosphate) such as $LiFePO_4$, $LiMnPO_4$, $LiNiPO_4$, and $LiCoPO_4$; ramsdellite type active materials such as $Li_2Ti_3O_7$; and a solid solution type active material including $Li_2Mn_2O_3$.

In addition, as for the oxide active material other than the general formula $Li_xM_yO_z$, a different kind of element substituent Li—Mn spinel represented by a general formula $Li_{1+x}Mn_{2-x-y}M_yO_4$ (x and y is an arbitrary real number; M is at least one kind of Al, Mg, Co, Fe, Ni and Zn), and lithium titanate represented by a general formula $Li_xTiO_y$ (x and y is an arbitrary real number) may be used as the transition metal oxide. Also, NASICON type active materials such as $Li_3V_2P_3O_{12}$ may be used; $V_2O_5$ (vanadium oxide) and $MoO_3$ (molybdenum oxide) may be used.

Examples of the shape of the oxide active material may include a granular shape. A particle of the oxide active material may be a primary particle and may be a secondary particle. The average particle diameter ($D_{50}$) of the oxide active material is in a range of 0.1 m to 50 μm for example. The average particle diameter may be measured by a dry particle distribution measurement.

The proportion of the oxide active material with respect to the composite active material is in a range of 10 weight % to 99 weight % for example, and preferably in a range of 20 weight % to 90 weight %. The reason therefor is because if the proportion of the oxide active material is small, the efficiency of the composite active material may decline.

3. Oxide Solid Electrolyte Layer

The oxide solid electrolyte layer in the present disclosure contains the oxide solid electrolyte material, and usually coats the surface of the oxide active material partially or entirely. The oxide solid electrolyte layer has a function to inhibit the reaction of the oxide active material with the sulfide solid electrolyte layer.

Examples of the oxide solid electrolyte material to be used for the oxide solid electrolyte layer may include a general formula: $Li_xMO_y$ (where x and y is an integer; M is at least one selected from the group consisting of B, C, Al, Si, P, S, Ti, Zr, Nb, Mo, Ta and W). Specific examples thereof may include $LiNbO_3$, $Li_3BO_3$, $LiBO_2$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $Li_2MoO_4$, $Li_2WO_4$ and arbitrary composite oxide of these. It is preferable that the oxide solid electrolyte material has high Li ion conductivity.

The thickness of the oxide solid electrolyte layer is preferably 0.1 nm or more for example, more preferably 1 nm or more, and particularly preferably 7 nm or more. Also, the thickness of the oxide solid electrolyte layer is preferably 100 nm or less for example, more preferably 20 nm or less, and particularly preferably 15 nm or less. Incidentally, the thickness of the oxide solid electrolyte layer is the average thickness.

The coverage of the oxide solid electrolyte layer on the surface of the oxide active material is preferably 80% or more for example, more preferably 90% or more, and particularly preferably 95% or more. The oxide solid electrolyte layer may coat the entire surface of the oxide active material. The coverage of the oxide electrolyte layer is preferably high.

4. Composite Active Material

The composite active material of the present disclosure has the above-described oxide active material, oxide solid electrolyte layer and sulfide solid electrolyte layer. The composite active material is in a granular shape for example. The average particle diameter of the composite active material may be close to the average particle diameter of the above-described oxide active material. The composite active material of the present disclosure is preferably used as the active material for a solid battery, for example.

B. Solid Battery

Figure 2:
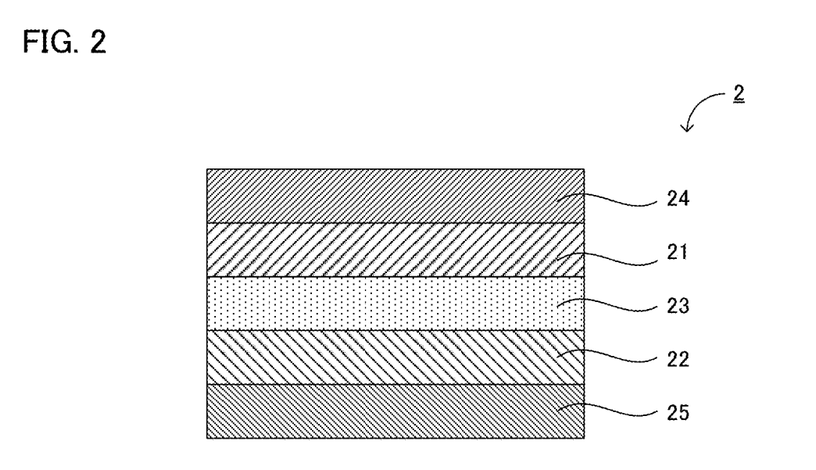
FIG. 2 is a schematic cross-sectional view illustrating an example of a solid battery of the present disclosure.

FIG. 2 is a schematic cross-sectional view illustrating an example of a solid battery of the present disclosure. The solid battery 2 shown in FIG. 2 has a cathode active material layer 21, an anode active material layer 22, a solid electrolyte layer 23 formed between the cathode active material layer 21 and the anode active material layer 22, a cathode current collector 24 for collecting currents of the cathode active material layer 21, and an anode current collector 25 for collecting currents of the anode active material layer 22. In the present disclosure, either the cathode active material layer 21 or the anode active material layer 22 contains the composite active material described in "A. Composite active material" above.

According to the present disclosure, either the cathode active material layer or the anode active material layer contains the above-described composite active material so as to provides a solid battery with high battery output.

A solid battery of the present disclosure will be hereinafter described in each constitution.

1. Cathode Active Material Layer

The cathode active material layer in the present disclosure contains at least a cathode active material. The cathode active material layer may further contain at least one of a solid electrolyte material, conductive material and binder as required.

In the present disclosure, the cathode active material layer may or may not contain the above-described composite active material. In other words, the cathode active material may be the above-described composite active material, and may not be the above-described composite active material. In one embodiment, the cathode active material is preferably the above-described composite active material.

The cathode active material layer may contain at least one of a solid electrolyte material, conductive material and binder as required. Examples of the solid electrolyte material may include the oxide solid electrolyte material and sulfide solid electrolyte material described in the section "A. Composite active material" above. Above all, the sulfide solid electrolyte material is preferable. Examples of the conductive material may include carbon materials such as acetylene black, Ketjen black, and carbon fiber, and metal materials. Also, examples of the binder may include fluoride containing binders such as PTFE and PVdF.

2. Solid Electrolyte Layer

The solid electrolyte layer in the present disclosure is a layer that contains at least a solid electrolyte material, and may further contain a binder as required. Examples of the solid electrolyte material may include the oxide solid electrolyte material and sulfide solid electrolyte material described in the section "A. Composite active material" above. In particular, the sulfide solid electrolyte material is preferable. The contents of the binder are the same as those described in the section "1. Cathode active material layer".

3. Anode Active Material Layer

The anode active material layer in the present disclosure contains at least an anode active material. The anode active material layer may further contain at least one of a solid electrolyte material, conductive material and binder as required.

In the present disclosure, the anode active material layer may or may not contain the above-described composite active material. In other words, the anode active material may be the above-described composite active material, and may not be the above-described composite active material. The anode active material, for example, may be a metal active material and a carbon active material. Examples of the metal active material may include a Li alloy, In, Al, Si and Sn. On the other hand, examples of the carbon active material may include graphite such as mesocarbon microbeads (MCMB) and highly oriented pyrolytic graphite, and amorphous carbons such as hard carbon and soft carbon.

The contents of the solid electrolyte material, binder, and conductive material to be used for the anode active material layer are the same as those described for the cathode active material layer.

4. Solid Battery

The solid battery of the present disclosure usually has a cathode current collector for collecting currents of the cathode active material layer, and an anode current collector for collecting currents of the anode active material layer.

The solid battery may be a primary battery and may be a secondary battery, but is preferably a secondary battery. The reason therefor is to be repeatedly charged and discharged and useful as a car-mounted battery, for example. The solid battery is preferably a lithium solid battery.

C. Method for Producing a Composite Active Material

Figure 3A:
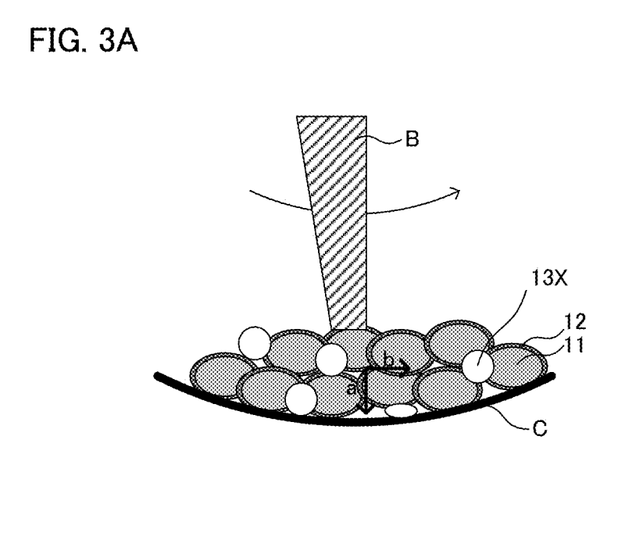
FIGS. 3A and 3B are schematic diagrams illustrating an example of a method for producing a composite active material of the present disclosure.
Figure 3B:
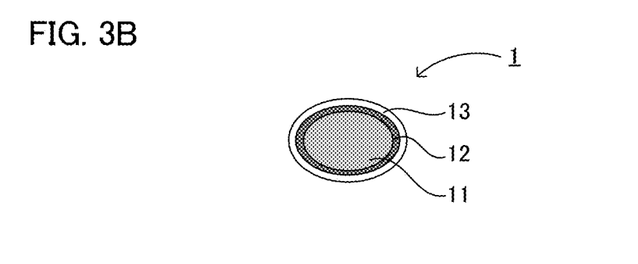

FIGS. 3A and 3B are schematic diagrams illustrating examples of a method for producing the composite active material of the present disclosure. In the method shown in FIGS. 3A and 3B, and as shown in FIG. 3A, a compression shearing treatment using a rotation blade is applied with respect to the oxide active material 11 coated with the oxide solid electrolyte layer 12, and to the sulfide solid electrolyte material 13X (coating step). In FIG. 3A, the blade B rotates so as to apply the compression shearing energy with respect to the oxide active material 11 coated with the oxide solid electrolyte layer 12, which exists between the blade B and the vessel C, and to the sulfide solid electrolyte material 13X. In particular, the compression energy "a" is applied to the normal direction of the rotation of blade B; the shearing energy "b" is applied in the tangential direction of the rotation of blade B. The sulfide solid electrolyte layer 13 may be formed and the composite active material 1 may be produced by the compression shearing treatment as shown in FIG. 3B. The present disclosure features the configuration where the compression shearing treatment is conducted under conditions of: under pressure that is decompressed to a pressure that is less than an atmospheric pressure; a blade rotation speed being in a range of 16.5 m/s to 19.8 m/s; and a treatment time being in a range of 10 minutes to 15 minutes.

According to the present disclosure, the compression shearing treatment is conducted under the pressure that is decompressed to less than an atmospheric pressure, at the specific blade rotation speed and for specific treatment time, so that the composite material with the capability of improving the battery output may be produced.

The sulfide solid electrolyte layer is presumed to be formed by the following phenomenon.

An oxide active material and an oxide solid electrolyte layer formed on the surface of the oxide active material are usually firm and thus not plastically deformed. On the other hand, a sulfide solid electrolyte material is usually softer than an oxide active material and an oxide solid electrolyte material, and thus easily plastically deformed. Thereby, a soft sulfide solid electrolyte material is plastically deformed by a compression shearing treatment which applies the friction and shearing energy (such as compression shearing energy), so that the sulfide solid electrolyte material is adhered to a firm oxide solid electrolyte layer. As a result, a sulfide solid electrolyte layer is formed.

In the present disclosure, the compression shearing treatment with respect to the oxide active material, oxide solid electrolyte layer, and sulfide solid electrolyte material is conducted under the pressure that is decompressed to less than an atmospheric pressure, so that the air existing between them may be decreased. It is presumed that the compression shearing energy applied to them may be improved thereby. Also, the blade rotation speed and the treatment time are in the specific range so as to adjust the level of the plastic deformation of the particle of the sulfide solid electrolyte material. It is presumed that the specific surface area and specific thickness (surface shape) of the sulfide solid electrolyte layer may be adjusted thereby.

The coating step in the producing method for the composite active material of the present disclosure will be hereinafter described in detail.

1. Coating Step

The coating step in the present disclosure is a step of forming the sulfide solid electrolyte layer by applying a compression shearing treatment using a rotation blade with respect to the oxide active material coated with the oxide solid electrolyte layer, and to the sulfide solid electrolyte material.

In the present disclosure, the coating step is conducted under the pressure that is decompressed to less than an atmospheric pressure. The decompression refers to the coating in a closed apparatus where the interior chamber is maintained at pressure below atmospheric pressure.

The level of the decompression is not particularly limited if it is less than an atmospheric pressure, and allows efficiency of coating the sulfide solid electrolyte layer to be improved. For example, it may be low vacuum (in a range of 100 Pa to 50 kPa), may be middle vacuum (in a range of 0.1 Pa to 100 Pa), may be high vacuum (in a range of $10^{-5}$ Pa to 0.1 Pa), and may be extra high vacuum ($10^{-5}$ Pa or less). The pressure of medium vacuum or less, which is 100 Pa or less is preferable. The reason therefor is to allow the efficiency of coating the sulfide solid electrolyte layer to be more favorable.

In the coating step, a compression shearing treatment using a rotation blade is conducted.

The compression shearing treatment using a rotation blade is usually a treatment to apply a compression shearing energy with respect to the mixture of the oxide active material coated with the oxide solid electrolyte layer and the sulfide solid electrolyte material (a treatment using a mechanical kneading method) by rotating the blade by a rotor, for example, in between the blade and the wall surface of the vessel. The compression shearing treatment using a rotation blade is typically a media-less treatment that does not utilize a crushing medium (such as a ball and beads). Mechanical and thermal damage to the composite active material may be reduced compared to a method using a crushing medium.

Examples of the compression shearing treatment apparatus may include a mechano-fusion system and a hybridization system. Specific examples thereof may include Nobilta™ (manufactured by Hosokawa Micron Corporation) and COMPOSI (manufactured by NIPPON COKE & ENGINEERING. CO., LTD.). Examples of the material for the blade may include ceramics, glass, and metal.

The compression shearing treatment may be a dry treatment or may be a wet treatment, but a dry treatment is preferable. The reason therefor is to allow the sulfide solid electrolyte layer to be formed while maintaining the composition ratio of the sulfide solid electrolyte material.

The blade rotation speed in the compression shearing treatment is usually 16.5 m/s or more and preferably 18 m/s or more, for example. Also, the blade rotation speed is usually 19.8 m/s or less and preferably 19.0 m/s or less, for example. The reason therefor is to allow the sulfide solid electrolyte layer to be formed in the desired specific surface area and thickness. The blade rotation speed is the rotation speed of the outermost periphery of the blade disposed in the rotor.

The rotation number of the blade in the compression shearing treatment is appropriately adjusted in accordance with the diameter of the blade, but it is preferably in a range of 2500 rpm to 3000 rpm.

The distance between the blade and the inner wall is in a range of 0.1 mm to 8 mm for example, more preferably in a range of 0.2 mm to 5 mm, and particularly preferably in a range of 0.5 mm to 2 mm.

The treatment time of the compression shearing treatment is usually 10 minutes (600 seconds) or more and more preferably 12 minutes (720 seconds) or more. The treatment time is usually 15 minutes (900 seconds) or less and preferably 13 minutes (780 seconds) or less above all. The reason therefor is to allow the sulfide solid electrolyte layer to be formed in the desired specific surface area and thickness.

The contents of the oxide active material and the oxide solid electrolyte layer to be used in the coating step may be the same as those described in the section "A. Composite active material" above, thus the description herein is omitted.

The sulfide solid electrolyte material is in a granular shape, for example. The average particle diameter ($D_{50}$) of the granular sulfide solid electrolyte material is preferably 0.96 m or more for example and more preferably 1.0 m or more. Also, the average particle diameter ($D_{50}$) of the sulfide solid electrolyte material is preferably 1.5 m or less, more preferably 1.4 m or less, and particularly preferably 1.35 m or less. With regard to the sulfide solid electrolyte material, the sulfide solid electrolyte material described in the section "A. Composite active material" may be used.

2. Method for Producing a Composite Active Material

The method for producing the composite active material of the present disclosure is not particularly limited if it has a coating step; a necessary step may be appropriately selected and added. Specific examples of the step to be added may include a step of coating the surface of the oxide active material with an oxide solid electrolyte layer, and a step of producing a sulfide solid electrolyte material.

Incidentally, the present disclosure is not limited to the above-mentioned embodiments. The above-mentioned embodiments are examples, and any is included in the technical scope of the present disclosure if it has substantially the same constitution as the technical idea described in the claim of the present disclosure and offers similar operation and effect thereto.

EXAMPLES

The present disclosure will be hereinafter described in further details with reference to examples.

Example (Production of Cathode Active Material)

A cathode active material ($LiNi_{1/3}Co_{1/3}Mn_{1/3}O_2$ coated with $LiNbO_3$) was produced in the following manner.

Lithium nickel cobalt manganate ($LiNi_{1/3}Co_{1/3}Mn_{1/3}O_2$) was used for the active material. Lithium niobate ($LiNbO_3$) (oxide solid electrolyte layer) was coated onto the active material by a sol-gel method. Specifically, the surface of the above-described active material was spray coated with a compound that was produced by dissolving equal molar amounts of $LiOC_2H_5$ and Nb $(OC_2H_5)_5$ in an ethanol solvent, by using a rolling flow coating apparatus (SFP-01™, manufactured by Powrex Corp.). After that, the coated active material was subjected to a heat treatment under an atmospheric pressure for 1 hour at 350° C., so as to form an oxide solid electrolyte layer ($LiNbO_3$, 10 nm thick, and the coverage being 99%). The cathode active material was produced in the above manner. The average particle diameter of the cathode active material was 6 μm.

(Production of Sulfide Solid Electrolyte Material)

A sulfide solid electrolyte material ($10LiI-15LiBr-75(0.75Li_2S-0.25P_2S_5)$) was produced in the following manner.

A lithium sulfide ($Li_2S$, manufactured by NIPPON CHEMICAL INDUSTRIAL CO., LTD.), lithium iodide (LiI, manufactured by NIPPON CHEMICAL INDUS-TRIAL CO., LTD.), LiBr (manufactured by JAPAN PURE CHEMICAL CO., LTD.), and pentasulfide diphosphate ($P_2S_5$, manufactured by Sigma-Aldrich Japan K.K.) were used as the starting raw materials. Powders of these were mixed in a glove box under an argon atmosphere at the ratio of 0.7178 g of $Li_2S$, 0.3715 g of LiI, 0.5573 g of LiBr, and 1.1573 g of $P_2S_5$ so as to obtain the raw material composition. Next, the raw material composition was mixed by an agate motor for 5 minutes, thereafter put into a pot made of zirconia along with 4 g of dehydrated heptane. The pot was placed in a planetary ball milling machine and subjected to the mechanical milling at the plate rotation speed of 370 rpm for 40 hours. A sulfide solid electrolyte material ($10LiI-15LiBr-75(0.75Li_2S-0.25P_2S_5)$) was obtained in this manner. The average particle diameter of the sulfide solid electrolyte material (average particle diameter of SE) was 1.34 μm.

(Coating Treatment (Compression Shearing Treatment))

A compression shearing treatment was conducted by using a particle compositing apparatus (NOB-MINI™, manufactured by Hosokawa Micron Corporation). Placed into the treatment vessel were 40 g of the cathode active material and 4.8 g of the sulfide solid electrolyte material. The compression shearing treatment was conducted under the conditions of: pressure: 100 Pa, distance between the rotation feather (blade) of the compression shearing rotor and the inner wall of the treatment vessel: 1 mm, blade rotation speed: 18.5 m/sec, and treatment time: 750 sec (12.5 min), to form a sulfide solid electrolyte layer (SE layer) on the surface of the cathode active material to obtain a composite active material.

Comparative Example 1

Mixed by an agate motor for 10 minutes (by dry mixing) were 40 g of the cathode active material ($LiNi_{1/3}Co_{1/3}Mn_{1/3}O_2$ coated with $LiNbO_3$) and 4.8 g of the sulfide solid electrolyte material ($10LiI-15LiBr-75(0.75Li_2S-0.25P_2S_5)$); the dry-mixed material was used for Comparative Example 1.

Comparative Examples 2 to 5

A composite active material was obtained by conducting a compression shearing treatment with respect to 40 g of the cathode active material and 4.8 g of the sulfide solid electrolyte material in the same manner as in the Example, except that the blade rotation speed and the treatment time were set to be the values shown in Table 1.

TABLE 1

| | Average particle diameter of SE [μm] | Blade rotation speed [m/s] | Treatment time [sec] |
| --- | --- | --- | --- |
| Example | 1.34 | 18.5 | 750 |
| Comparative Example 1 | 1.34 | — | — |
| Comparative Example 2 | 1.34 | 13.2 | 300 |
| Comparative Example 3 | 1.34 | 26.4 | 300 |
| Comparative Example 4 | 1.34 | 13.2 | 1500 |
| Comparative Example 5 | 1.34 | 26.4 | 1500 |

[Evaluation]

(Measurement for Coverage of SE Layer)

The composite active materials produced in Example and Comparative Examples 2 to 5 were measured by XPS (X-ray photoelectron spectrometry) and the element ratio (ER) was calculated from the peak cross-sectional area of each element. The element ratio of each element was inserted to the following formula so as to calculate the coverage of the sulfide solid electrolyte layer (coverage of SE layer). The result is shown in Table 2.

Coverage (%)=$(ER_P+ER_S+ER_I+ER_{Br})/(ER_{Mn}+ER_{Co}+ER_{Ni}+ER_{Nb}+ER_P+ER_S+ER_I+ER_{Br})$ (In the formula, $ER_P$ represents the element composition ratio of a phosphate element, $ER_S$ represents the element composition ratio of a sulfur element, $ER_I$ represents the element composition ratio of an iodine element, $ER_{Br}$ represents the element composition ratio of a bromine element, $ER_{Mn}$ represents the element composition ratio of a manganese element, $ER_{Co}$ represents the element composition ratio of a cobalt element, $ER_{Ni}$ represents the element composition ratio of a nickel element, and $ER_{Nb}$ represents the element composition ratio of a niobium element, respectively.)

(Evaluation for Specific Surface Area)

The surface area of the produced composite active material was measured by $N_2$ absorbing BET method and divided by the weight of each sample (sulfide solid electrolyte material, oxide active material and oxide solid electrolyte material) so as to calculate the specific surface area. The result is shown in Table 2.

(Measurement for Thickness of SE Layer)

The average particle diameter was measured by a dry particle distribution measurement. The thickness of the sulfide solid electrolyte layer (thickness of SE layer) was calculated by dividing the difference between the average particle diameter of the cathode active material before the compression shearing treatment and the average particle diameter of the composite active material after the compression shearing treatment by 2. The result is shown in Table 2.

(SEM Observation)

Figure 4A:
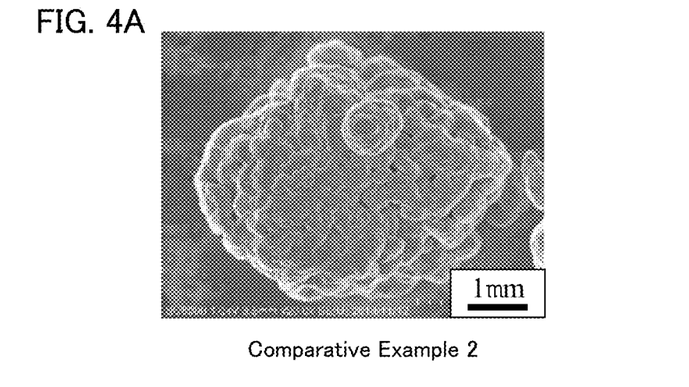
FIGS. 4A and 4B are the results of SEM imaging for the composite active materials in the Example and Comparative Examples 2 to 5.
Figure 4B:
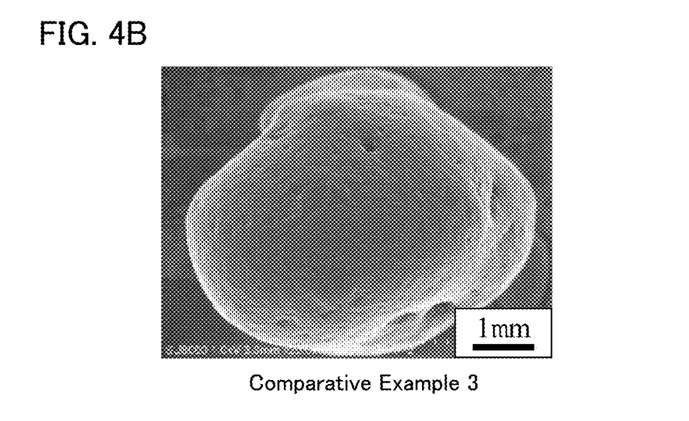

The surface SEM image (20,000 magnifications) of the composite active materials in Comparative Examples 2 and 3 were taken. The result is shown in FIGS. 4A and 4B.

(Evaluation for Battery Output)

<Production of Evaluation Battery>

An evaluation battery was produced by using the obtained composite active material (material in Comparative Example 1).

First, at the weight ratio, 87.8 weight % of the cathode active material, 10.4 weight % of the sulfide solid electrolyte material, 1.1 weight % of VGCF, and 0.7 weight % of PVDF were mixed so as to obtain a cathode mixture.

Next, at the weight ratio, 64.1 weight % of an anode active material (layered carbon), 34.7 weight % of the sulfide solid electrolyte material, and 1.3 weight % of PVDF were mixed so as to obtain an anode mixture.

The sulfide solid electrolyte material was put into a cylindrical having an inner diameter of 1 $cm^2$, pressed at 1 ton for 1 minute, so as to form a separating layer (300 μm thick). The cathode mixture was put on one side of the separating layer, the surface flattened, and then pressed at 1 ton for 1 minute to form a cathode mixture layer (37 μm thick). Next, the anode mixture was put on the other side of the separating layer, the surface flattened, and then pressed at 6 ton for 1 minute to obtain an anode mixture layer (56 μm thick). An aluminum foil (cathode current collector) was disposed on the cathode mixture layer side and a copper foil (anode current collector) was disposed on the anode mixture layer side to form battery elements. The battery elements were restrained at the restraining pressure of 15 MPa so as to obtain an evaluation battery.

<Measurement for Battery Output>

A battery output was measured by using a 5-second constant power discharge method. The evaluation battery was adjusted to the below OCV voltage (potential), and then the maximum electric power value discharged in 5 seconds was determined as the battery output.

Measurement condition: OCV potential 3.66 V, Cut-off voltage 2.5 V

A battery output increasing rate was calculated by applying the ratio of the battery output in the Example to the following formula, while setting the battery output in the Comparative Examples as 100%.

Battery output increasing rate (%)=Ratio of battery output in Example−100%

The result is shown in Table 2.

TABLE 2

|  | Specific surface area [$m^2$/g] | Thickness of SE layer [nm] | Coverage of SE layer [%] | Battery output increasing rate [%] |
|---|---|---|---|---|
| Example | 1.10 | 24.0 | 99.0 | 22 |
| Comparative Example 1 | — | — | — | Basis |
| Comparative Example 2 | 1.59 | 20.0 | 94.5 | −13 |
| Comparative Example 3 | 1.00 | 33.5 | 98.4 | −39 |
| Comparative Example 4 | 1.30 | 57.0 | 96.2 | −25 |
| Comparative Example 5 | 0.99 | 21.0 | 96.4 | — |

In the Example, it was confirmed that the battery output was improved compared to Comparative Example 1.

On the other hand, in Comparative Examples 2 to 4, it was confirmed that the battery output was decreased compared to Comparative Example 1. Also, the battery in Comparative Example 5 did not function as a battery.

It was confirmed from the Example and Comparative Examples 3 and 4 that the battery output was decreased when the thickness of the sulfide solid electrolyte layer was larger than 25 nm. The reason therefor is presumed to be that too thick sulfide solid electrolyte layer was a cause of breaking the electron conduction path.

It was confirmed from the specific surface area in Comparative Example 2 and FIG. 4A that a lot of sulfide solid electrolyte particles existed on the surface of the composite active material when the specific surface area of the sulfide solid electrolyte layer was large. Thereby, it is presumed that the sufficient ion conducting path was not obtained since the cathode active material was not allowed to sufficiently adhere to the SE layer. On the other hand, it was confirmed from the specific surface area in Comparative Example 3 and FIG. 4B that the flat SE layer was formed in the composite active material when the specific surface area of the sulfide solid electrolyte layer was small. Thereby, it is presumed that the electron conducting path was not sufficiently obtained since the contacting area of the composite active material with the conductive material in the battery was small.

The specific surface area in the Example is smaller than that in Comparative Example 2, and is larger than that in Comparative Example 3. Accordingly, it is presumed that the shape of the composite active material in the Example was such that the particle of the sulfide solid electrolyte material appropriately remained (a shape with appropriate concave and convex areas on the particle surface). It is presumed that both the improvement in the contacting area of the composite active material with the conductive material and adherence of the cathode active material to the SE layer may be achieved in the shape where the particle of the sulfide solid electrolyte material appropriately remained. Accordingly, it is presumed that a micro structure in which both the electron and ion easily relate to the electrode reaction is formed by adjusting the specific surface area of the sulfide solid electrolyte layer.

Reference Examples 1 to 16

In order to specify the range of thickness and specific surface area of the sulfide solid electrolyte layer for obtaining the effect of battery output improvement, changes were made to the SE average particle diameter, blade rotation speed, and treatment time that may affect the thickness and specific surface area. Specifically, the compression shearing treatment was conducted under the same operation conditions as in Example 1 except for changing the value of the SE average particle diameter, blade rotation speed, and treatment time to be the values shown in Table 3, to produce a composite active material.

TABLE 3

|  | SE average particle diameter [μm] | Treatment time [sec] | Blade rotation speed [m/s] |
|---|---|---|---|
| Reference Example 1 | 0.65 | 300 | 13.2 |
| Reference Example 2 | 1.34 | 300 | 13.2 |
| Reference Example 3 | 0.65 | 300 | 26.4 |
| Reference Example 4 | 1.34 | 300 | 26.4 |
| Reference Example 5 | 0.65 | 1500 | 13.2 |
| Reference Example 6 | 1.34 | 1500 | 13.2 |
| Reference Example 7 | 0.65 | 1500 | 26.4 |
| Reference Example 8 | 1.34 | 1500 | 26.4 |
| Reference Example 9 | 0.65 | 900 | 19.8 |
| Reference Example 10 | 1.34 | 900 | 19.8 |
| Reference Example 11 | 0.96 | 900 | 13.2 |
| Reference Example 12 | 0.96 | 900 | 26.4 |
| Reference Example 13 | 0.96 | 300 | 19.8 |
| Reference Example 14 | 0.96 | 1500 | 19.8 |
| Reference Example 15 | 0.96 | 900 | 19.8 |
| Reference Example 16 | 0.96 | 900 | 19.8 |

Figure 5:
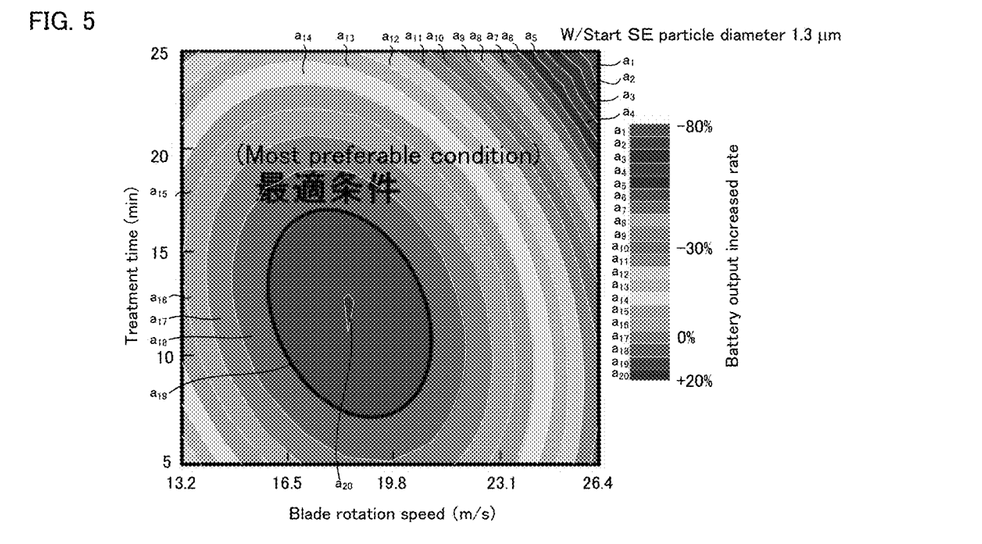
FIG. 5 shows the results of a response surface analysis (battery output increasing rate) in Reference Examples 1 to 16.
Figure 6:
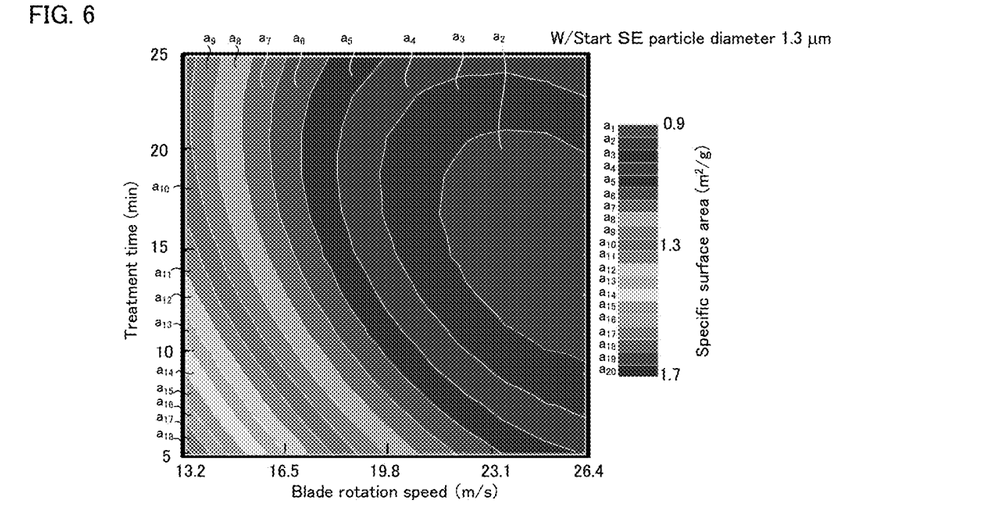
FIG. 6 shows the results of a response surface analysis (specific surface area of SE layer) in Reference Examples 1 to 16.
Figure 7:
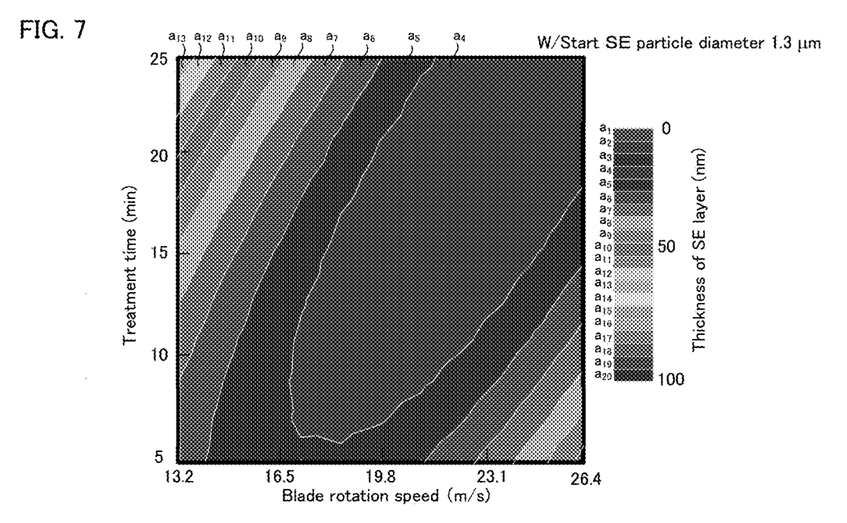
FIG. 7 shows the results of a response surface analysis (average thickness of SE layer) in Reference Examples 1 to 16.
Figure 8:
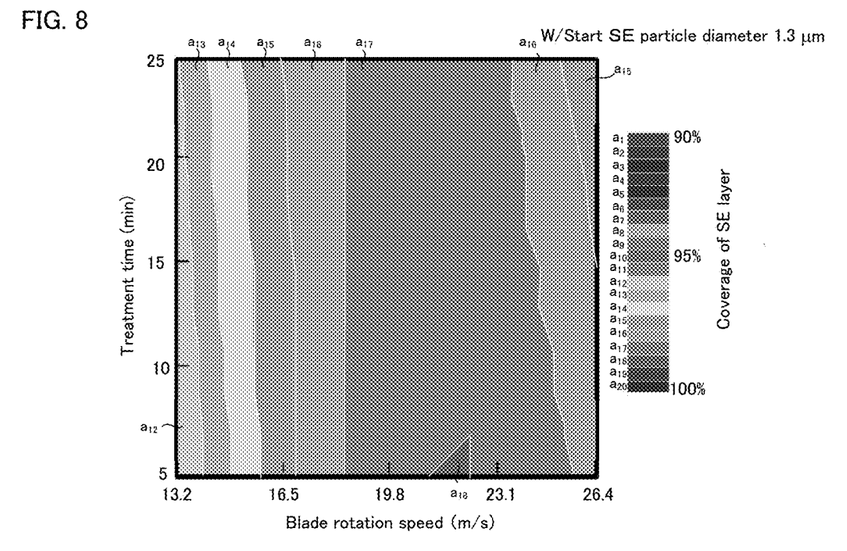
FIG. 8 shows the results of a response surface analysis (coverage of SE layer) in Reference Examples 1 to 16.

The battery output increasing rate, specific surface area, thickness of SE layer, and coverage of SE layer in Reference Examples 1 to 16 were measured in the same manner as in Example; a central composite design (surface centered) was set up by using the SE average particle diameter, treatment time and blade rotation speed as factors, and the result was statistically analyzed by means of a response surface analysis. The results are shown in FIG. 5 to FIG. 8. Incidentally, $a_1$ to $a_{20}$ in FIG. 5 are in a unit of 5%, $a_1$ to $a_{20}$ in FIG. 6 are in a unit of 0.04 $m^2/g$, $a_1$ to $a_{20}$ in FIG. 7 are in a unit of 5 nm, and $a_1$ to $a_{20}$ in FIG. 8 are in a unit of 0.5%.

It was suggested from FIG. 5 that the composite active material with a capability of increasing the battery output by 15% or more compared to Comparative Example 1, was produced when the conditions were: blade rotation speed: 16.5 m/s to 19.8 m/s, treatment time: 10 minutes to 15 minutes (which fell in the range included in $a_{19}$ in FIG. 5).

With the blade rotation speed and treatment time obtained from the analysis result in FIG. 5, suggested from each figure are as follows: FIG. 6 shows the specific surface area of the sulfide active material became 1.06 $m^2/g$ to 1.22 $m^2/g$ (which fell in the range of $a_4$ and $a_5$ in FIG. 6); FIG. 7 shows the thickness of the SE layer became 15 nm to 25 nm (which fell in the range of $a_4$ to $a_8$ in FIG. 7). On the other hand, it was suggested from FIG. 8 that the coverage of the SE layer was not so affected by the treatment time, which means it would not affect the improvement of the output. In other words, it was suggested that the composite active material with the specific surface area being 1.06 $m^2/g$ to 1.22 $m^2/g$, and the thickness of the SE layer being 15 nm to 25 nm improved the battery output.

Incidentally, FIG. 5 to FIG. 8 show the distribution when the SE average particle diameter was 1.35 m; however, a similar level of the distribution was shown when the SE average particle diameter was changed.

From the Example and Reference Examples 1 to 16, it was confirmed that the composite active material actually capable of improving the battery output may be obtained under the production condition of the composite active material, and the range of specific surface area and thickness of the sulfide solid electrolyte layer in the composite active material, obtained from the response surface analysis.

REFERENCE NUMBER LIST 1 composite active material
2 solid battery
11 oxide active material
12 oxide solid electrolyte layer
13 sulfide solid electrolyte layer
13X sulfide solid electrolyte material
21 cathode active material layer
22 anode active material layer
23 solid electrolyte layer
B blade
C vessel

What is claimed is:

1. A method for producing a composite active material comprising an oxide active material, an oxide solid electrolyte layer that coats a surface of the oxide active material, and a sulfide solid electrolyte layer that coats a surface of the oxide solid electrolyte layer, wherein
the sulfide solid electrolyte layer has a specific surface area in a range of 1.06 $m^2/g$ to 1.22 $m^2/g$, and a thickness of the sulfide solid electrolyte layer is in a range of 15 nm to 25 nm,
the method comprising;
a coating step of forming the sulfide solid electrolyte layer by applying a compression shearing treatment using a rotation blade, wherein
the compression shearing treatment is conducted under a pressure less than an atmospheric pressure; a blade rotation speed being in a range of 16.5 m/s to 19.8 m/s; and a treatment time in a range of 10 minutes to 15 minutes.

2. The method for producing a composite active material of claim 1, wherein said sulfide solid electrolyte layer has a specific surface area of 1.08 $m^2/g$ 1.22 $m^2/g$.

3. The method for producing a composite active material of claim 1, wherein said sulfide solid electrolyte layer has a specific surface area of 1.18 $m^2/g$ or less.

4. The method for producing a composite active material of claim 1, wherein said sulfide solid electrolyte layer coats 90% or more of a surface of said oxide solid electrolyte layer.

5. The method for producing a composite active material of claim 1, wherein said sulfide solid electrolyte material includes an ion conductor containing Li, A and S, where A is at least one selected from the group consisting of P, Si, Ge, Al, and B.

6. The method for producing a composite active material of claim 1, wherein said oxide solid electrolyte layer includes an oxide active material having the formula $Li_xM_yO_z$, where M is a transition metal; x=0.02 to 2.2; y=1 to 2; and z=1.4 to 4.

* * * * *